Apr. 24, 1923.

C. B. JACKSON 1,453,140

TIRE PROTECTOR

Filed April 3, 1922

2 Sheets-Sheet 1

Apr. 24, 1923.
C. B. JACKSON
TIRE PROTECTOR
Filed April 3, 1922
1,453,140
2 Sheets-Sheet 2
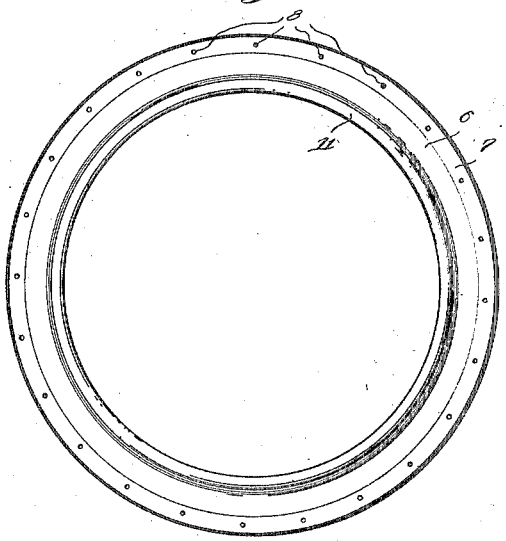
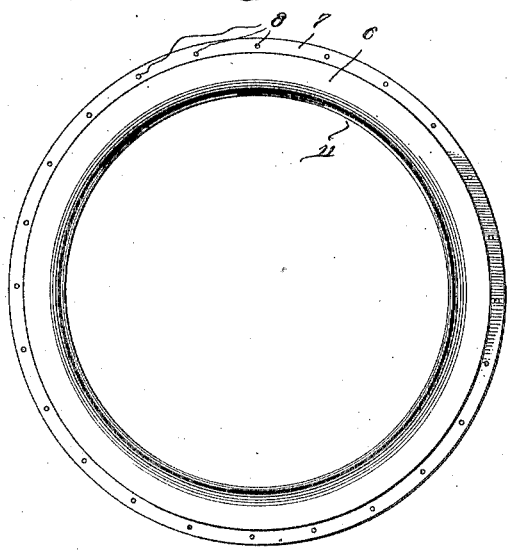
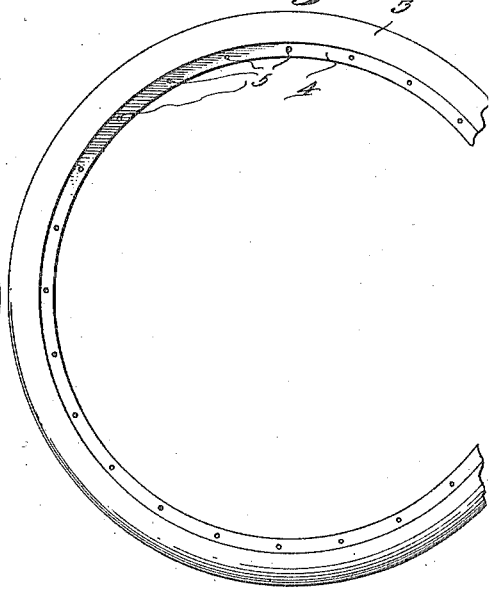

Patented Apr. 24, 1923.

1,453,140

UNITED STATES PATENT OFFICE.

CRUSSELLE B. JACKSON, OF HARTSELLS, ALABAMA.

TIRE PROTECTOR.

Application filed April 3, 1922. Serial No. 549,063.

*To all whom it may concern:*

Be it known that I, CRUSSELLE B. JACKSON, a citizen of the United States, residing at Hartsells, in the county of Morgan and State of Alabama, have invented new and useful Improvements in Tire Protectors, of which the following is a specification.

This invention relates to a protector for pneumatic tires, the principal object of the invention being to provide a steel tread for the tire with means for holding the same in place on the tire.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
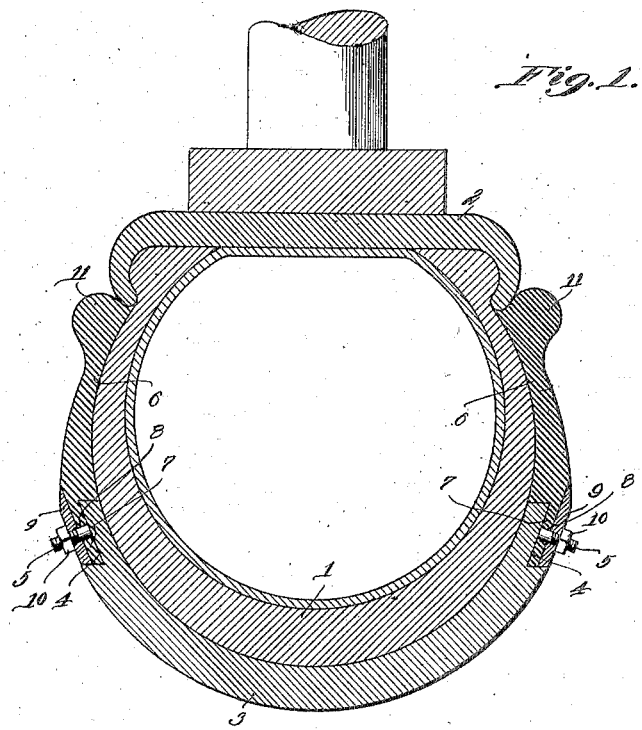
Figure 2:
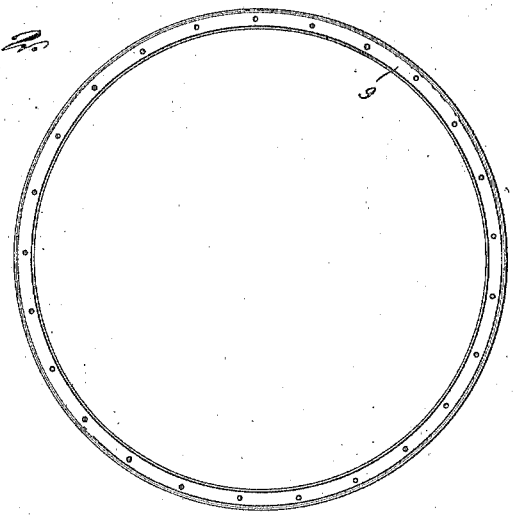

Figure 1 is a cross sectional view through a portion of a wheel and tire showing my invention in use.

The remaining figures are detail views.

In these views 1 indicates the pneumatic tire of a wheel which is connected with the rim 2 of the wheel in any desired manner. In carrying out my invention I provide a ring 3 of steel or the like which is made of such a size as to receive the tread part of the tire within it, the cross sectional shape of the ring being such as to conform to the shape of the outer half of the tire when the same has been inflated. The edges of the ring are recessed, as at 4, and studs 5 project from these recesses. Annular bands 6 of rubber, or composition rubber, are arranged to engage the side walls of the tire, each band having a reduced outer edge, shown at 7, for engaging the recess 4. Eyelets 8 are formed in these reduced portions to receive the studs 5. Rings 9 of steel or the like are adapted to engage the reduced portions of the bands to clamp the same in the recesses and these rings are provided with holes for receiving the studs 5 and the studs are screw threaded to receive the nuts 10 which hold the rings in clamping position. The inner edges of the bands 6 are provided with the beads 11 which act to stiffen the bands and hold them in place upon the tire.

It will thus be seen that the steel member 3 is securely held on the tire so that it is impossible for the tire to be punctured and the device will not interfere with the cushioning effect of the tire. The tread face of the ring 3 can be roughened or provided with projections to secure proper traction.

The rubber bands are to be made slightly smaller in circumference than the tire so that they will stretch when the tire is inflated, thus firmly holding the parts in position.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A tire protector of the class described comprising a metal ring of trough shape in cross section to receive the tread part of the tire, the edges of the ring being recessed, studs in said recesses, bands of resilient material having reduced parts fitting in said recesses and eyelets in the reduced parts engaging the studs, steel rings engaging the reduced parts of the bands and having holes therein for receiving the studs, nuts engaging the studs for holding the steel rings in position and beads formed on the inner edges of the bands for holding them in engagement with the side walls of the tire.

2. A tire protector comprising a metallic ring of trough shape in cross section to receive the threaded part of the tire, said ring having its edges recessed and studs located therein and projecting therefrom, annular bands of rubber arranged to engage the side walls of the tire, each band having a reduced outer edge for engaging the recess in the edge of the metallic ring, said reduced portions having eyelets formed therein to receive said studs, steel rings engaging reduced portions of the bands clamping the same in recess, said rings having openings therein for receiving the studs which are screw threaded, the beads provided on the inner edges of the bands for stiffening the latter and holding them in place on the tire.

In testimony whereof I affix my signature.

CRUSSELLE B. JACKSON.